(12) United States Patent
Johansson et al.

(10) Patent No.: US 11,943,636 B2
(45) Date of Patent: Mar. 26, 2024

(54) NETWORK NODE AND METHOD FOR BEAM MANAGEMENT IN A WIRELESS COMMUNICATIONS NETWORK

(71) Applicant: Telefonaktiebolaget LM Ericsson (publ), Stockholm (SE)

(72) Inventors: Nicklas Johansson, Brokind (SE); Per Burström, Lulea (SE); Anders Landstrom, Boden (SE); Kristina Hessler, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 558 days.

(21) Appl. No.: 17/264,042

(22) PCT Filed: Aug. 20, 2018

(86) PCT No.: PCT/SE2018/050836
§ 371 (c)(1),
(2) Date: Jan. 28, 2021

(87) PCT Pub. No.: WO2020/040672
PCT Pub. Date: Feb. 27, 2020

(65) Prior Publication Data
US 2021/0306868 A1    Sep. 30, 2021

(51) Int. Cl.
*H04W 16/28* (2009.01)
*H04B 7/08* (2006.01)
(Continued)

(52) U.S. Cl.
CPC ............ *H04W 16/28* (2013.01); *H04B 7/088* (2013.01); *H04W 72/046* (2013.01); *H04W 72/23* (2023.01); *H04W 72/542* (2023.01)

(58) Field of Classification Search
CPC ... H04W 16/28; H04W 72/046; H04W 72/23; H04W 72/542; H04B 7/088; H04B 7/0695
See application file for complete search history.

(56) References Cited

U.S. PATENT DOCUMENTS

| 2013/0039345 | A1  | 2/2013 | Kim et al. |
| 2015/0236772 | A1* | 8/2015 | Hammarwall ........ H04L 5/0048 370/329 |

(Continued)

FOREIGN PATENT DOCUMENTS

| WO | 2016198124 A1 | 12/2016 |
| WO | 2017028315 A1 | 2/2017 |
| WO | 2018082040 A1 | 5/2018 |

OTHER PUBLICATIONS

International Search Report and Written Opinion dated Sep. 5, 2019 for International Application No. PCT/SE2018/050836 filed on Aug. 20, 2018, consisting of 11—pages.
(Continued)

*Primary Examiner* — Tejis Daya
(74) *Attorney, Agent, or Firm* — Christopher & Weisberg, P.A.

(57) ABSTRACT

A method performed by a network node for beam management. The network node receives one or more quality values from a User Equipment (UE). The one or more quality values are measured by the UE on first reference signals transmitted by the network node in respective one or more beams in a first set of candidate beams. The A serving beam is selected out of the first set of candidate beams based on the received quality values for data communication with the UE. The network node creates a rule related to signal quality. The network node obtains one or more second quality values related to respective subsequent messages transmitted to the UE in the selected serving beam. As long as the rule is
(Continued)

fulfilled with respect to the second quality value, the network node transmits one or more further subsequent messages only in the serving beam.

18 Claims, 8 Drawing Sheets

(51) Int. Cl.
  *H04W 72/044* (2023.01)
  *H04W 72/23* (2023.01)
  *H04W 72/542* (2023.01)

(56) References Cited

U.S. PATENT DOCUMENTS

| | | | | |
|---|---|---|---|---|
| 2017/0034730 A1* | 2/2017 | Zhang | ............... | H04W 36/30 |
| 2017/0207843 A1* | 7/2017 | Jung | ............... | H04W 74/006 |
| 2017/0207845 A1* | 7/2017 | Moon | ............... | H04B 7/088 |
| 2017/0288763 A1* | 10/2017 | Yoo | ............... | H01Q 3/30 |
| 2018/0041319 A1* | 2/2018 | Cheng | ............... | H04B 7/0695 |
| 2020/0028603 A1* | 1/2020 | Wang | ............... | H04L 5/0057 |

OTHER PUBLICATIONS

3GPP TSG RAN WG1#89 R1-1709035; Title: Beam measurement and reporting; Agenda Item: 7.1.2.2.3; Source: Samsung; Document for: Discussion and Decision; Date and Location: May 15-19, 2017, Hangzhou, China, consisting of 4—pages.

3GPP TSG RAN WG1 Meeting #95 R1-1813558; Title: UL/DL BM for latency/overhead reduction; Agenda Item: 7.2.8.6; Source: Huawei, HiSilicon; Document for: Discussion and Decision; Date and Location: Nov. 12-16, 2018, Spokane, USA, consisting of 4—pages.

EPO Communication and Supplementary Search Report dated Mar. 11, 2022 for Patent Application No. 18930862.0, consisting of 8—pages.

* cited by examiner

| Measurement points | Number of CSI-RS transmitted | | Threshold |
| --- | --- | --- | --- |
| | Brute force beam search | Proposed solution | $\|T_x - T_0\|$ |
| P0 | 8 | 8 | 0 |
| P1 | 8 | 1 | $< \Delta_T$ |
| P2 | 8 | 1 | $< \Delta_T$ |
| P3 | 8 | 1 | $< \Delta_T$ |
| P4 | 8 | 8 | $> \Delta_T$, reset |
| P5 | 8 | 1 | $< \Delta_T$ |
| Total number of CSI-RS sent | 48 | 20 | |

NETWORK NODE AND METHOD FOR BEAM MANAGEMENT IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application Number: PCT/SE2018/050836, filed Aug. 20, 2018 entitled "A NETWORK NODE AND METHOD FOR BEAM MANAGEMENT IN A WIRELESS COMMUNICATIONS NETWORK," the entirety of which is incorporated herein by reference.

TECHNICAL FIELD

Embodiments herein relate to a network node in a wireless communications network, and a method therein. In particular, they relate to beam management in a wireless communications network.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5th Generation (5G). A service area or cell area is a geographical area where radio coverage is provided by the radio network node. The radio network node communicates over an air interface operating on radio frequencies with the wireless device within range of the radio network node. The radio network node communicates to the wireless device in DownLink (DL) and from the wireless device in UpLink (UL).

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3rd Generation (3G) networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Beamforming of data and control signaling is crucial for the performance of next generation networks, such as e.g. in 5G. In analog beamforming, a signal is amplified in a spatial direction over the entire bandwidth for a given Transmission Time Interval (TTI), i.e. during a duration of one transmission in a radio link. Beam management is primarily used in analog beamforming to select beams to transmit or receive data on. It may also be used in digital beamforming. With beam management is herein meant a set of procedures to manage and/or control the beams with which e.g. a radio node communicates data with a UE. Beam management may include procedures such as beam sweeping, beam measurements, beam determination, beam reporting and beam failure recovery. Finding the best beam usually requires searching a beam space. The searching of the beam space is also known as beam sweeping. With beam space is herein meant a set of beams in the horizontal and/or vertical direction. This may e.g. be performed by measuring the effective beamformed channel on known reference signals and feeding back the measurement reports to the transmitting network node. With effective beamformed channel is herein meant the product of the channel matrix and the port to antenna mapping of the analog beam of the beamformed channel. In NR, 3GPP has standardized multiple reference signal measurements and reporting of signal measurements to enable beam management. These include Channel State Information Reference Signals (CSI-RS) and CSI-RS specifically for Beam Management (CSI-RS-BM). In addition, the UEs may report signal measurements on Synchronization Signal Blocks (SSBs) which is periodic in time but may be transmitted on multiple beams. The SSBs define the downlink coverage of a network node but since each SSB is associated with a static overhead loss, the SSBs may be beamformed with fewer beams than what is used for data. Typical configurations involve forming 1, 4 or 8 wide beams per sector for SSB. The coverage area of a network node may be divided into multiple units. Each such unit is referred to as a sector. Beamforming for data may in contrast involve an arbitrary number of beams, depending on array design. Full beamforming gain may only be obtained for data beams. For beam management purposes, multiple reference signals may be transmitted on different beam candidates. A beam candidate herein designates a beam which may potentially be selected, i.e. is a candidate to being selected, as a beam over which the data communication will be transmitted, e.g. a serving beam. A Reference Signal Received Power (RSRP) measurement report comprising information of up to the four best beam candidates may be requested from the UE. Typical solutions involve testing a number of beams using different algorithms, such as random, closest neighbor search, or alternating between wide and narrow beams.

A UE may be configured to detect beam failure by monitoring beam failure detection reference signals (RS) transmitted from a network node. This is typically monitored for the current Transmission reception point (TRP) Transmit Physical Downlink Control Channel (TRP Tx PDCCH) beam. The TRP is the network node point transmitting to UEs connected to it and receiving transmissions from UE connected to it. Beam failure detection RS include periodic CSI-RS for beam management and SSB. A UE may also indicate beam failure if the hypothetical Block Error Rate (BLER) for a PDCCH drops below a certain threshold. BLER is a ratio of the number of erroneous blocks to the total number of blocks transmitted Hypothetical BLER here indicates that it is not actually the BLER that is measured. Instead a Signal-to-Interference-plus-Noise-ratio (SI NR) measurement is done and when it is a below a certain level it represents that the BLER has dropped below a certain threshold. This is a similar procedure as is used to determine Radio Link Monitoring (RLM) out-of-sync indication. A beam failure event occurs if the number of consecutive detected beam failure instances exceeds a configured maximum number.

To recover from beam failure, the UE identifies a new candidate beam using SSB measurements and transmits a beam failure recovery request on the Physical Random Access Channel (PRACH) to the serving network node, such as a base station, which sends a response back to the UE if it is able to receive the beam failure recovery request.

In analog beamforming, each beam candidate evaluation, which is performed for each UE, requires a dedicated Orthogonal Frequency-Division Multiplexing (OFDM) symbol in the downlink and consumes uplink Physical Uplink Control Channel (PUCCH) or Physical Uplink Shared Channel (PUSCH) resources for reporting the measurements back to the network node. Evaluating multiple beam candidates thus carries an overhead load or cost. Furthermore, periodic evaluation schemes comes with a trade-off between overhead and performance degradation due to suboptimal beam choice caused by UE and/or environment mobility. Thus, one end of the spectrum is to do over-provisioning with testing of beam candidates. By performing a large amount of tests even UEs having fast-moving channel properties are covered by the best beam. This performance increase comes at the cost of a large signaling overhead At the other end of the spectrum, reference signals may be transmitted to test beams very sparsely. In this case beam failure detection may be relied upon to determine when to switch beams. However, UE reception may deteriorate substantially before the beam failure event is triggered.

SUMMARY

As a part of developing embodiments herein the inventors have identified a problem which first will be discussed.

A problem is that detecting beam failures and recovering from the beam failures only improves performance for UEs with low Signal-to-interference-plus-noise Ratio (SINR). There is no performance gain from doing failure recovery for other UEs. This is due to the fact that there is a low number of failures to correct. There is a performance loss from doing beam sweeping more seldom. The performance loss comes from the fact that the SINR is lowered due to the infrequent beam sweeping. However, it is not lowered to the degree that it results in a beam failure.

Beam failure recovery also has a cost in signaling e.g. through CSI-RS/SS signaling for beam failure detection, SS signaling for new candidate beam detection, PRACH signaling for UE beam failure request transmission and PDCCH signaling for BS response to beam failure request transmission.

An object of embodiments herein is to improve the performance in a wireless communications network using multiple beams.

According to a first aspect of embodiments herein, the object is achieved by a method performed by a network node for beam management in a wireless communications network.

The network node receives one or more quality values from a User Equipment, UE. The one or more quality values are measured by the UE on first reference signals transmitted by the network node in respective one or more beams comprised in a first set of candidate beams. The network node then selects a serving beam for an upcoming data communication with the UE. The serving beam is selected out of the first set of candidate beams based on the received quality values. The network node creates a rule related to signal quality. The network node obtains one or more second quality values related to respective subsequent messages transmitted to the UE in the selected serving beam. As long as the rule is fulfilled with respect to the second quality value, the network node transmits one or more further subsequent messages only in the serving beam.

According to a second aspect of embodiments herein, the object is achieved by a network node for beam management in a wireless communications network. The network node is configured to:

Receive, from a User Equipment, UE, one or more quality values measured by the UE on first reference signals transmitted by the network node in respective one or more beams comprised in a first set of candidate beams.

Select for an upcoming data communication with the UE, a serving beam out of the first set of candidate beams based on the received quality values.

Create a rule related to signal quality.

Obtain one or more second quality values related to respective subsequent messages transmitted to the UE in the selected serving beam.

As long as the rule is fulfilled with respect to the second quality value, transmit one or more further subsequent messages only in the serving beam.

By creating a rule related to signal quality and only transmit messages in the serving beam as long as the rule is fulfilled will lead to less signaling overhead for beam management resources, leaner transmissions. This is since unnecessary frequent beam candidate evaluations are avoided. This results in an improved performance in a wireless communications network using multiple beams.

An advantage of embodiments herein is that they provide a sufficient signal quality while at the same time avoiding beam failure events. Avoiding beam failure events saves signaling overhead. Providing sufficient signal quality means that the embodiments provide better performance, in terms of received signal strength, compared to already known solutions with similar amount of overhead and less overhead compared to already known solutions with similar performance, in terms of received signal strength.

BRIEF DESCRIPTION OF THE DRAWINGS

Examples of embodiments herein are described in more detail with reference to attached drawings in which.

DETAILED DESCRIPTION

Figure 1:
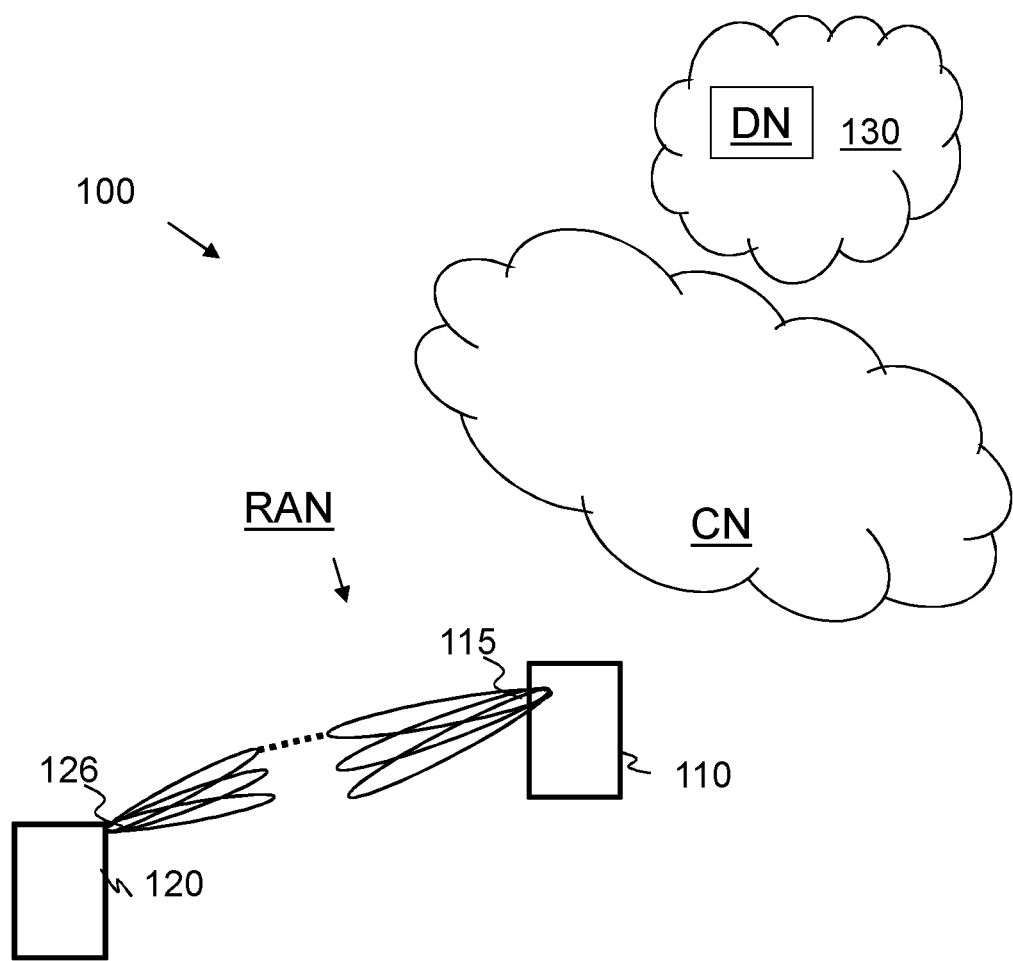
FIG. 1 is a schematic block diagram illustrating embodiments of a wireless communications network.

FIG. 1 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes such as a network node 110 operate in the wireless communications network 100, providing radio coverage by means of antenna beams, referred to as beams herein. The network node 110 provides a number of beams 115 also referred to as antenna beams, and may use these beams for communicating with e.g. one or more User Equipment, UEs 120, see below. The network node 110 is a radio node such as e.g. a base station or a UE.

The network node 110 provides radio coverage over a geographical area by means of the antenna beams. The geographical area may be referred to as a cell, a service area, beam or a group of beams. The network node 110 may in this case be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within the cell served by network node 110 depending e.g. on the radio access technology and terminology used.

User Equipments operate in the wireless communications network 100, such as a UE 120. The UE 120 provides radio coverage by means of antenna beams 126, also referred to as beams herein.

The UE, 120, may e.g. be an NR device, a mobile station, a wireless terminal, an NB-IoT device, an eMTC device, a CAT-M device, a WiFi device, an LTE device and an a non-access point (non-AP) STA, a STA, that communicates via a base station such as e.g. the network node 110, one or more Access Networks (AN), e.g. RAN, to one or more core networks (CN). It should be understood by the skilled in the art that the UE relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

Thus, the network node 110 provides a number of beams which may be used for transmissions between the network node 110 and respective one or more UEs 120.

The methods according to embodiments herein are performed by the network node 110. As an alternative, a Distributed Node DN and functionality, e.g. comprised in a cloud 130 as shown in FIG. 1 may be used for performing or partly performing the methods.

In order to provide a beam management with low signaling overhead and adequate quality in the wireless communications network 100, the network node 110 herein applies a method for beam management according to embodiments such as e.g. a beam failure avoidance and management method or scheme. In an example scenario, the beam management method tracks the time evolution of quality values measured by the UE 120 such as e.g. measurement reports made on only the serving beam itself. The measurement reports are related to beam quality. The network node 110 first finds the best beam and selects it as a serving beam using a traditional search sweep over multiple downlink reference signals transmitted in a set of beam candidates. After the selection of the serving beam, a rule or metric is created also referred to as constructed, based on the reported quality value of the beam. This rule may determine when to obtain e.g. calculate other or new beam candidates. This may in some embodiments be performed by comparing new reported quality values to the previously reported ones. As long as the rule such as a condition of the rule or metric is fulfilled, the network node 110 transmits periodic reference signals only for the serving beam. This may typically be the case for extended time periods, e.g. from hundreds of milliseconds up to hours. In this way signalling overhead is minimized.

Figure 2:
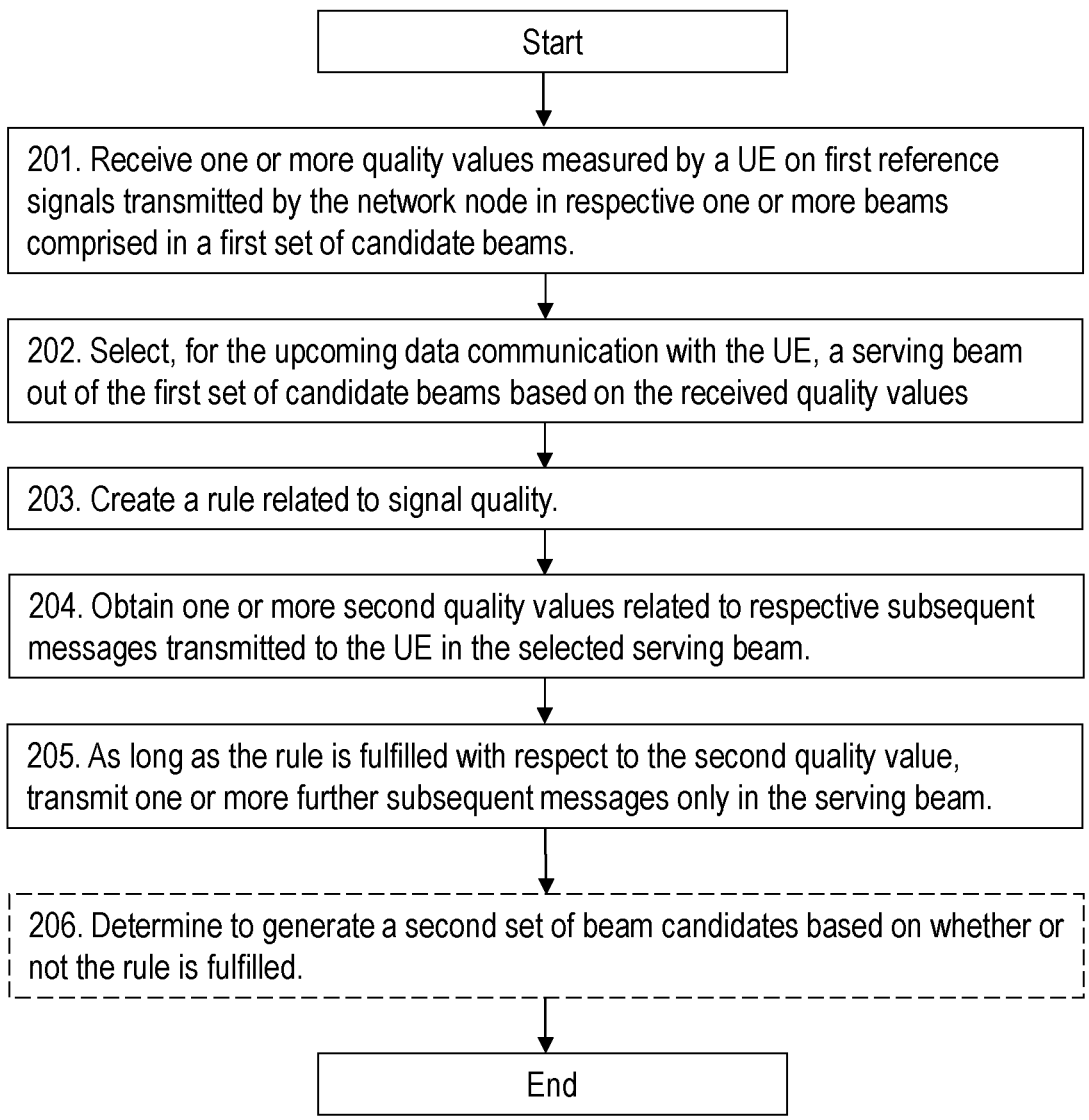
FIG. 2 is a flowchart depicting embodiments of a method in a network node.

Example embodiments of a method performed by a network node 110 for beam management in a wireless communications network 100 will now be described with reference to a flowchart depicted in FIG. 2. Dashed boxes represent optional method steps.

The method comprises the following actions, which actions may be taken in any suitable order.

Action 201

In order to apply the beam management method the network node 110 first need to select, also referred to as choose, a serving beam to be used in an upcoming data communication with the UE 120. A serving beam when used herein is the beam through which the data communication between the network node 110 and the UE 120 will take place. The serving beam is to be selected among candidate beams transmitted by the network node 110. A candidate beam when used herein is a beam which the network node 110 instructs the UE 120 to measure and report a quality value for, so that the network node 110 can decide if this beam should be used as a new serving beam. Thus, the network node 110 receives from the UE 120, one or more quality values measured by the UE 120 on first reference signals transmitted by the network node 110 in respective one or more beams comprised in a first set of candidate beams. The set of candidate beams may e.g. be the four beams with highest quality value resulting from a beam sweep. A beam sweep when used herein is an evaluation of the candidate beams transmitted from the network node 110 based on measurement results on reference signals.

Action 202

The network node 110 has now received a first set of candidate beams among which a serving cell with good quality will be selected to be used for the upcoming data communication with the UE 120. The network node 110 accordingly selects, for the upcoming data communication with the UE 120, a serving beam out of the first set of candidate beams based on the received quality values. The beam selected as serving beam may e.g. be the optimal beam with regards to the received quality values, e.g. the beam having the highest quality value.

Action 203

In order to determine whether quality values of the serving beam that later on will be reported still are adequate, the network node 110 creates a rule to follow. Thus, the network node, creates a rule related to signal quality.

According to some embodiments, the rule defines a quality value based on the first quality value. The defined quality value may then be a value which may e.g. be a bit above or a bit below the first quality value or the same as the first quality value.

According to some other embodiments, the rule defines a reference quality value or an absolute quality value. A reference quality value may e.g. be a value based on the quality value for the serving beam but time filtered so that it changes over time to adapt to minor changes in the reported quality values for the serving beam. An absolute quality value is a pre-set value which is considered an adequate beam quality. The value may e.g. be in in dB.

Action 204

According to embodiments herein, the network node 110 will continue to use the serving beam as long as the quality of the serving beam is adequate. In order to determine or evaluate whether the quality of the serving beam is not deteriorating, the network node 110 occasionally needs to know the current quality value of the serving beam. Thus, the network node 110 obtains one or more second quality values related to respective subsequent messages transmitted to the UE 120 in the selected serving beam.

According to some embodiments, the messages may be reference signals and the second quality values are measured by the UE 120 on respective subsequent reference signals transmitted in the selected serving beam.

The subsequent messages may e.g. be messages comprising data or reference signals. In this way the network node 110 will have information regarding the current quality of the serving beam.

Action 205

According to embodiments herein, the network node 110 will continue to use the serving beam as the beam for communication with the UE 120 until the quality of the serving beam degrades below a minimally adequate level. Thus, as long as the rule is fulfilled with respect to the second quality value, the network node 110 transmits one or more further subsequent messages only in the serving beam. In this way signaling overhead is decreased since there is less signaling dedicated to beam management. At the same time quality measurements are performed and reported to the network node 110 to ensure that the signal quality is sufficient for the communication.

According to some embodiments, the rule is decided to be fulfilled based on a comparison of the second quality value with a quality value defined by the rule. As mentioned above, in some embodiments, the rule defines the quality value based on the first quality value. In these embodiments, the rule may be fulfilled as long as the difference between the second quality value and the first quality value is below a first threshold value and above a second threshold value. The first threshold value may e.g. be dB or more, e.g. anything between 0 and 6 dB. A typical example value may be 3 dB. The second threshold value may e.g. be 0 dB or less, e.g. anything between 0 and −6 dB. An exampleal example value may be −3 dB.

As further mentioned above, in some embodiments, the rule defines a reference quality value. The rule is then fulfilled as long as the difference between the second quality value and the reference quality value is below a third threshold value and above a fourth threshold value. The third threshold value may e.g. be 0 dB or more. An example value may be 3 dB, e.g. anything between 0 and 6 dB. The fourth threshold value may e.g. be 0 dB or less, e.g. anything between 0 and −6 dB. An example value may be −3 dB.

As yet further mentioned above, in some embodiments, the rule defines an absolute quality value. The rule is then fulfilled as long as the second quality value is above the absolute quality value.

According to some of these embodiments, the message is any one out of a PDCCH message and a PDSCH message.

Furthermore, the respective second quality value is based on whether or not it is considered that the UE 120 has received the message from the network node 110. Thus, the second quality value may e.g. be based on whether or not the UE 120 has received a message transmitted from the network node 110. E.g. when the UE 120 has not received the message it is an indication that the second quality value is poor and the rule is not fulfilled, and when the UE 120 has received the message it is an indication that the second quality value is good and the rule is then fulfilled. According to some of these embodiments, the respective second quality value is initially set to the same value as the absolute quality value. It is thereafter increased a predetermined step when it is considered that the UE 120 has received the message and decreased a predetermined step when it is considered that the UE 120 has not received the message. Thus, the second quality value increases when the message is considered to have been received, thereby increasing the quality value measure of the serving beam, and thus decreasing the likelihood of the network node 110 changing serving beams. In an analogous manner the second quality value decreases when the message is not considered to have been received. This decreases the quality value measure of the serving beam and thereby increases the likelihood of the network node 110 changing serving beams. As an example, the UE 120 is considered to have been able to receive a DL assignment on PDCCH if a Hybrid Automatic Repeat Request (HARQ) Acknowledgment (ACK) or Negative Acknowledgment (NACK) is received when expected and considered to not have been able to receive the DL assignment if a HARQ ACK or NACK is not received when expected. According to some other of these embodiments, the respective second quality value is initially set to the same value as the absolute quality value. The absolute quality value is thereafter decreased a predetermined step when it is considered that the UE 120 has received the message and increased a predetermined step when it is considered that the UE 120 has not received the message. Thus, in these embodiments the absolute quality value is altered in response to whether the message is considered to have been received or not. If the message is considered to have been received the absolute quality value is decreased, reflecting that the quality measure of the serving beam is considered to be better than before. Inversely, if the message is not considered to have been received, the absolute quality value is increased. The probability of the second quality value being lower than the absolute quality value is then increased, reflecting the fact that the quality measure of the serving beam is considered to be worse than before.

Action 206

The network node 110 may determine to generate a second set of beam candidates based on whether or not the rule is fulfilled. Thus, if the rule is not fulfilled a second set of beam candidates are obtained. As an example, a new serving beam e.g. exhibiting a higher quality than the current serving beam, can then e.g. be selected from the candidate beams.

Embodiments herein such as mentioned above will now be further described and exemplified. The text below is applicable to and may be combined with any suitable embodiment described above.

To perform beam management in the wireless communications network 100, according to an example scenario, which e.g. may comprises operating an analog beamforming scheme the network node 110 will first select the serving beam to be used in the upcoming data communication with the UE 120. This relate to action 201 above.

Thus, in order to select a serving beam, quality values for a set of candidate beams transmitted by the network node 110 are evaluated by the UE 120 in a beam sweep and the highest one to four values are reported to the network node 110. Thus, the network node 110 receives from the UE 120, one or more quality values measured by the UE 120 on first reference signals transmitted by the network node 110 in respective one or more beams comprised in a first set of candidate beams. This relates to Action 202 above.

The network node 110 then selects a serving beam out of the first set of candidate beams based on the received quality values to be used for the upcoming data communication with the UE 120. The network node 110 may e.g. select the candidate beam with highest quality value, in this example scenario called beam A, to be used as a serving beam for the upcoming data communication with the UE 120.

The network node 110 then creates a rule related to signal quality. This relates to Action 203 above. The network node 110 may further set a reference quality value $T_0$, which may also for brevity be referred to as only quality value $T_0$. The reference quality value $T_0$ may be defined by the rule. The reference quality value $T_0$ may be based on or pertain to the quality value for the beam reported by the UE 120 before initiating downlink data transmissions using this beam, i.e. the first quality value.

The long-term channel properties of the UE 120 may change with mobility, i.e. during movement of the UE 120. To assess the beam quality over time, the network node 110 may transmit one or more subsequent messages only in beam A, i.e. only in the serving beam. The subsequent messages may for instance be reference signals. The reference signals may in turn be CSI-RS-BM. The UE 120 may then be configured to transmit, or report, one or more second quality values $T_X$ related to the subsequent messages transmitted to the UE 120. This relates to Action 204 above. Thus, the UE 120 may report the corresponding quality values, also referred to as quality measurements, continuously as a response to the transmitted messages from the network node 110. The quality values may according to one embodiment be reported RSRP values.

Figure 3:
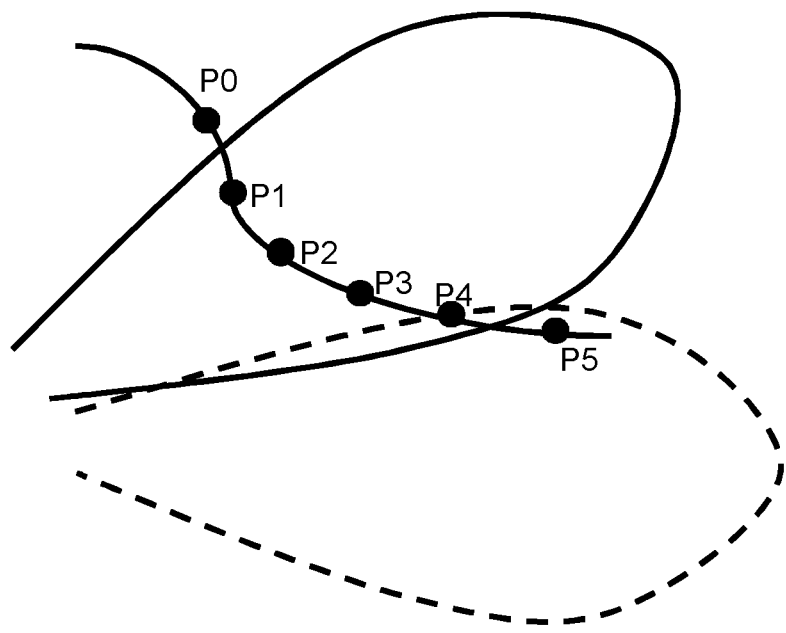
FIG. 3 is a schematic diagram depicting embodiments herein.

The following relates to Action 205 above. As described above, in some further embodiments, the rule defines a quality value $T_0$ based on the first quality value, i.e. the quality value for the beam reported by the UE 120 before initiating downlink data transmissions using the beam as a serving beam. The rule may then be fulfilled as long as the difference between the second quality value and the first quality value is below a first threshold A To value and above a second threshold value $\Delta T_1$. Thus, the network node 110 compares the reported second quality values $T_X$ to the stored quality value $T_0$. The rule is then not fulfilled if the difference exceeds or is lower than one of the two thresholds $\Delta T_0$ and $\Delta T_1$, i.e. $T_X - T_0 > \Delta T_0$ or $T_X - T_0 < \Delta T_1$. The network node 110 may then trigger a beam sweep as a response to the rule not being fulfilled. FIG. 3 show an illustration of this embodiment with a single threshold. An example of a UE passing through a spatial direction of a beam is shown along a path comprising a number of measurement points P0-P5. A quality metric, defined at P0, is above a threshold at measurement points P1 to P3. This is used to indicate that tracking the serving beam is sufficient, i.e. the quality of the beam is adequate. At P4, the metric is less than the threshold. This means that the beam quality gets poor and should not be used any more. The beam quality is therefore inadequate and a set of 8 candidate beams are evaluated. The evaluation result in a change to another serving beam, where the threshold is reset. The threshold being reset means that the state of the procedure is set to Action 203 above, where the rule may be updated based on the reported quality value for the new serving beam.

According to some of these embodiments, the rule defines a reference quality value. The reference quality value may initially be based on the first quality value, i.e. the quality value for the beam reported by the UE 120 before initiating downlink data transmissions using the beam as a serving beam. The reference quality value may then be time filtered and change over time such that minor changes in the reported second quality values $T_X$ will not trigger a beam sweep Time filtered when used herein means that several reported quality values for the serving beam measured and reported by the UE 120 at different times are combined according to a selected mathematical function. The rule may then be fulfilled as long as the difference between the second quality values $T_X$ and the reference quality value is below a third threshold value and above a fourth threshold value.

As further mentioned above, in some embodiments the rule defines an absolute quality value $\Delta$. According to some embodiments, the rule may then be fulfilled as long as the second quality value is above the absolute quality value. Thus, in these embodiments the network node 110 compares the reported second quality values $T_X$ to the absolute quality value $\Delta$. If the second quality values $T_X$ are lower than the absolute quality value $\Delta$, i.e. if $T_X < \Delta$, the rule is not fulfilled. The network node 110 may then e.g. trigger a beam sweep.

According to some of these embodiments the second quality value $T_X$ is based on whether or not it is considered that the UE 120 has received the messages from the network node 110.

The second reported second quality values $T_X$ may then be updated based on if the UE 120 is considered to have been able to receive a message from the network node 110 or not. The message may for example be a PDCCH message. The UE 120 is e.g. considered to have been able to receive a DL assignment on PDCCH if a HARQ ACK or NACK is received when expected by the network node 110. Similarly, the UE 120 may be considered to not have been able to receive the DL assignment if a HARQ ACK or NACK is not received when expected by the network node 110. As another example, the UE 120 is considered to have been able to receive an UL grant if an UL transmission is detected when expected by the network node 110. Similarly, the UE 120 may be considered to not have been able to receive an UL grant if an UL transmission is not detected when expected by the network node 110. After initializing or setting the second quality value $T_X$ equal to the absolute quality value Δ, the second quality value $T_X$ may thereafter be increased a certain predetermined step Δpdcchup when it is considered that the UE 120 has been able to receive the message and decreased a certain predetermined step Δpdcchdown when it is considered that the UE 120 has not been able to receive the message.

According to some other of these embodiments, the second quality value $T_X$ is set or initialized equal to the absolute quality value Δ. The absolute quality value Δ is then updated based on if the UE 120 is considered to have been able to receive a message from the network node 110 or not. In this case, the absolute quality value Δ is decreased in case of a successfully received message, e.g. a successful PDCCH reception. Analogously, the absolute quality value Δ is increased in case of an unsuccessfully received message, e.g. a failed PDCCH reception.

According to some other of these embodiments the message failure rate is measured. The message failure rate may e.g. be calculated by dividing the number of messages that failed to be received by the total number of messages received. As an example, the PDCCH failure rate may be measured. This would be calculated by dividing the number of failed PDCCH receptions by the total number of PDCCH receptions. The second quality value $T_X$ or the absolute quality value Δ may then be decreased respectively increased if the failure rate is larger than a certain threshold. For example, if the PDCCH failure rate is measured, the failure rate threshold may be a PDCCH BLER operation point that a link adaption is targeting. As another example, the PDSCH failure rate is measured. This would be calculated by dividing the number of failed PDSCH receptions by the total number PDSCH receptions. The failure rate threshold would then be the PDSCH BLER operation point that the link adaption is targeting. If the failure rate is greater than the threshold the second quality value $T_X$ is decreased by a certain step. Alternatively, the absolute quality value Δ is decreased a certain step. Link adaptation includes selection of modulation and code rate. The selection is often done based on reported channel quality from the UE 120. Since there may be uncertainties in the reported quality due to for example measurement errors, delays between measuring the channel quality in the UE 120 and receiving in the network node 110 and infrequently sent reports the network node 110 often uses an outer loop which increases or decreases the reported channel quality with certain step sizes due to if an HARQ ACK or an HARQ NACK is received. The outer loop is configured with step sizes so that a certain HARQ BLER, eg 10%, should be achieved in average.

According to some other of these embodiments the second quality value $T_X$ may be updated based on if a HARQ ACK or a HARQ NACK is sent from the UE 120. If the network node 110 receives a HARQ NACK from the UE 120, the second quality value $T_X$ may be decreased by a certain step Δpdschdown. Analogously, the second quality value $T_X$ may be increased by a certain step Δpdschup, if the network node 110 receives a HARQ ACK from the UE 120.

According to some other of these embodiments, the absolute quality value Δ is decreased in case of a successful PDSCH reception. Analogously, the absolute quality value Δ is increased in case of a failed PDSCH reception.

Figure 4A:
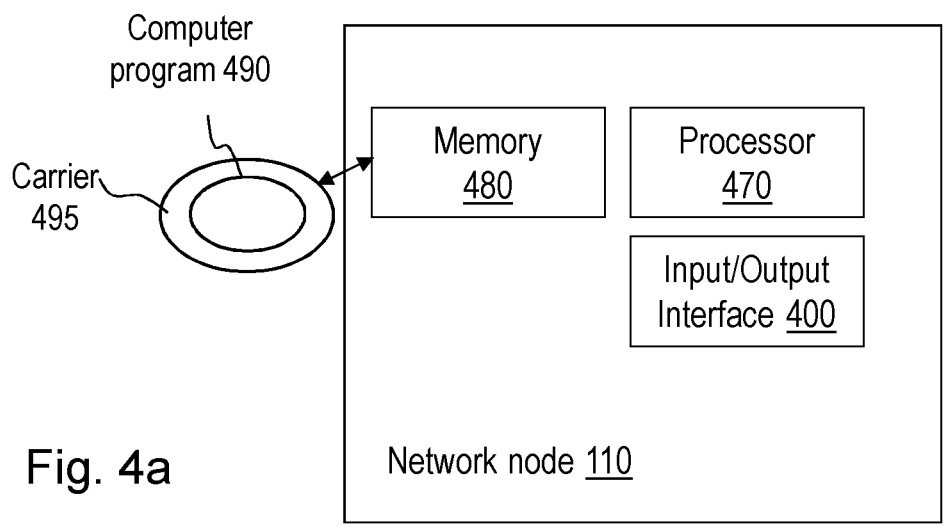
FIGS. 4a and b are schematic block diagrams illustrating embodiments of a network node.
Figure 4B:
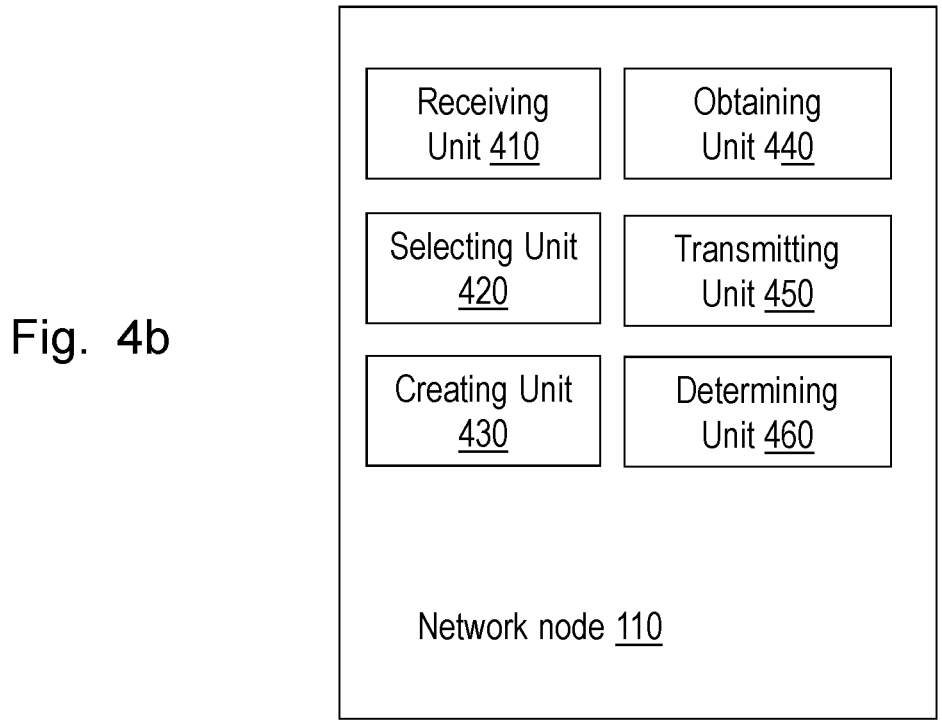

To perform the method actions above for beam management in a wireless communications network 100, the network node 110 may comprise the arrangement depicted in FIGS. 4a and 4b.

The network node 110 may comprise an input and output interface 400 configured to communicate e.g. with the UE 120. The input and output interface 400 may comprise a wireless receiver not shown and a wireless transmitter not shown.

The network node 110 is configured to, e.g. by means of a receiving unit 410 in the network node 110, receive from the UE 120, one or more first quality values measured by the UE 120 on first reference signals transmitted by the network node 110 in respective one or more beams comprised in a first set of candidate beams.

The network node 110 is further configured to, e.g. by means of a selecting unit 420 in the network node, select for an upcoming data communication with the first UE 120, a serving beam out of the first set of candidate beams based on the received quality values.

The network node 110 is further configured to, e.g. by means of a creating unit 430 in the network node, create a rule related to signal quality.

According to some embodiments the rule is adapted to define a quality value based on the first quality value.

According to some other embodiments the rule is adapted to define a reference quality value or an absolute quality value.

The network node 110 is further configured to, e.g. by means of a obtaining unit 440 in the network node, obtain one or more second quality values related to respective subsequent messages transmitted to the UE 120 in the selected serving beam.

In some embodiments, the messages are adapted to be reference signals. Furthermore, the second quality values, may be adapted to be measured by the UE 120 on subsequent reference signals transmitted in the selected serving beam.

The network node 110 is further configured to, e.g. by means of a transmitting unit 450 in the network node 110, as long as the rule is fulfilled with respect to the second quality value, transmit one or more further subsequent messages only in the serving beam.

According to some embodiments, the rule is to be decided to be fulfilled based on a comparison of the second quality value with a quality value defined by the rule.

The network node 110 may further be configured to, e.g. by means of a determining unit 460 in the network node 110, determine to generate a second set of beam candidates based on whether or not the rule is fulfilled.

As mentioned above, in some embodiments, the rule is adapted to define a quality value based on the first quality value. In these embodiments, the rule may be adapted to be fulfilled as long as the difference between the second quality value and the first quality value is below a first threshold value and above a second threshold value.

As further mentioned above, in some embodiments the rule is adapted to define a reference quality value. The rule may then be adapted to be fulfilled as long as the difference between the second quality value and the reference quality value is below a third threshold value and above a fourth threshold value.

As yet further mentioned above, in some embodiments the rule is adapted to define an absolute quality value. The rule is then adapted to be fulfilled as long as the second quality value is above the absolute quality value.

According to some of these embodiments, the message is any one out of a PDCCH message and a PDSCH message. Furthermore, the respective second quality value is then based on whether or not it is considered that the UE 120 has received the message from the network node 110.

According to some of these embodiments the respective second quality value is initially set to the same value as the absolute quality value. The second quality value is then increased a predetermined step when it is considered that the UE 120 has received the message, and decreased a predetermined step when it is considered that the UE 120 has not received the message.

According to some other of these embodiments the respective second quality value is initially set to the same value as the absolute quality value. The absolute quality value is then decreased a predetermined step when it is considered that the UE 120 has received the message, and increased a predetermined step when it is considered that the UE 120 has not received the message.

The embodiments herein may be implemented through a respective processor or one or more processors, such as a processor 470 of a processing circuitry in the network node 110 depicted in FIG. 4a, together with a respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 480 comprising one or more memory units. The memory comprises instructions executable by the processor 470. The memory 480 is arranged to be used to store e.g. information about the one or more first quality values measured by the UE 120 on the first reference signals, the rule or rules created by the network node 110, the one or more second quality values, the one or more subsequent messages, the reference quality value, the absolute quality value, the step size of the predetermined steps and applications to perform the methods herein when being executed in the network node 110.

Those skilled in the art will also appreciate that the units in network node 110 mentioned above may refer to a combination of analog and digital circuits, and/or one or more processors configured with software and/or firmware, e.g. stored in network node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Further Extensions and Variations

Figure 5:
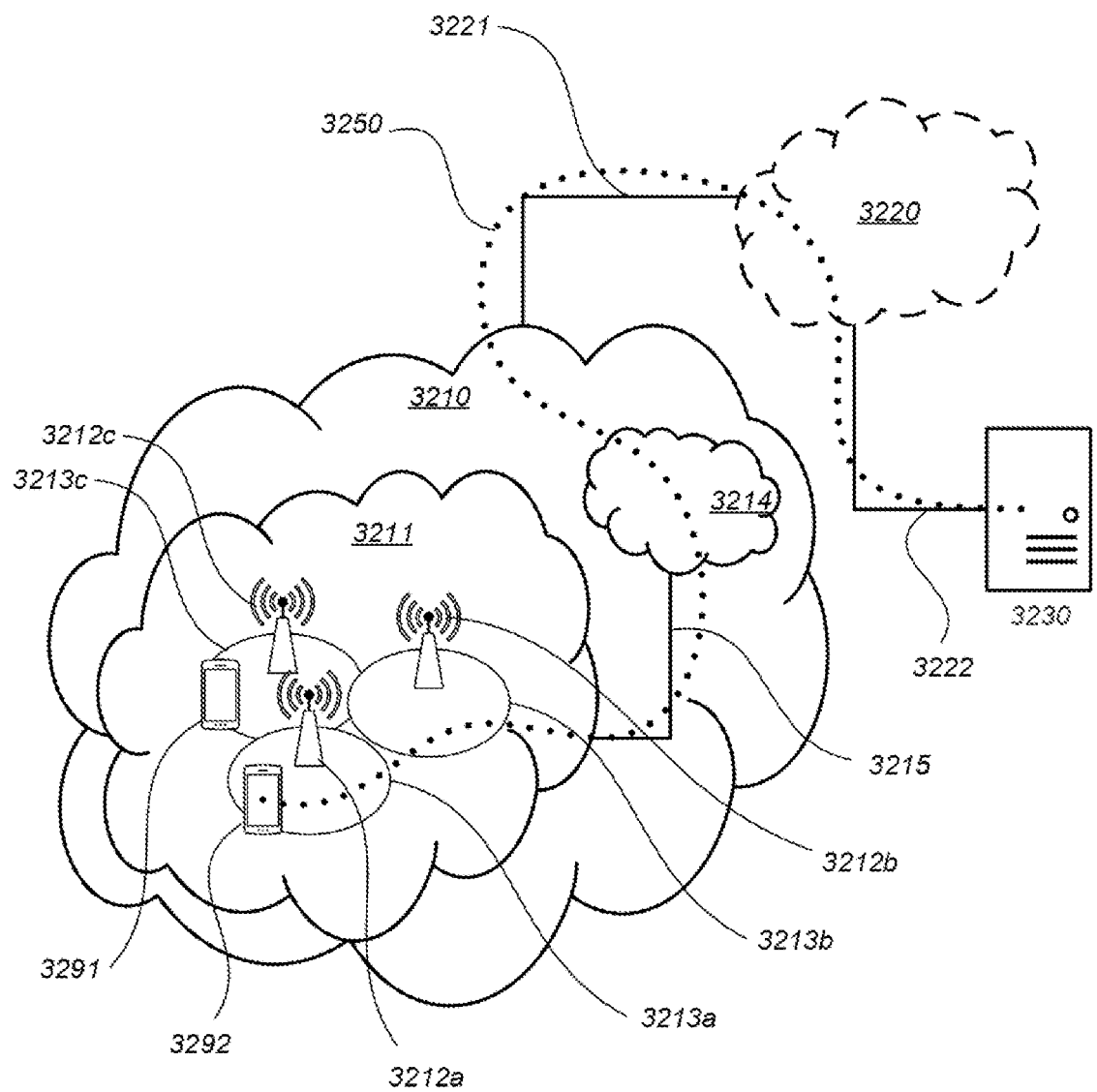
FIG. 5 schematically illustrates a telecommunication network connected via an intermediate network to a host computer.

With reference to FIG. 5, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the network node 110, 130, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless device 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 5 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 6. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 6) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 6:
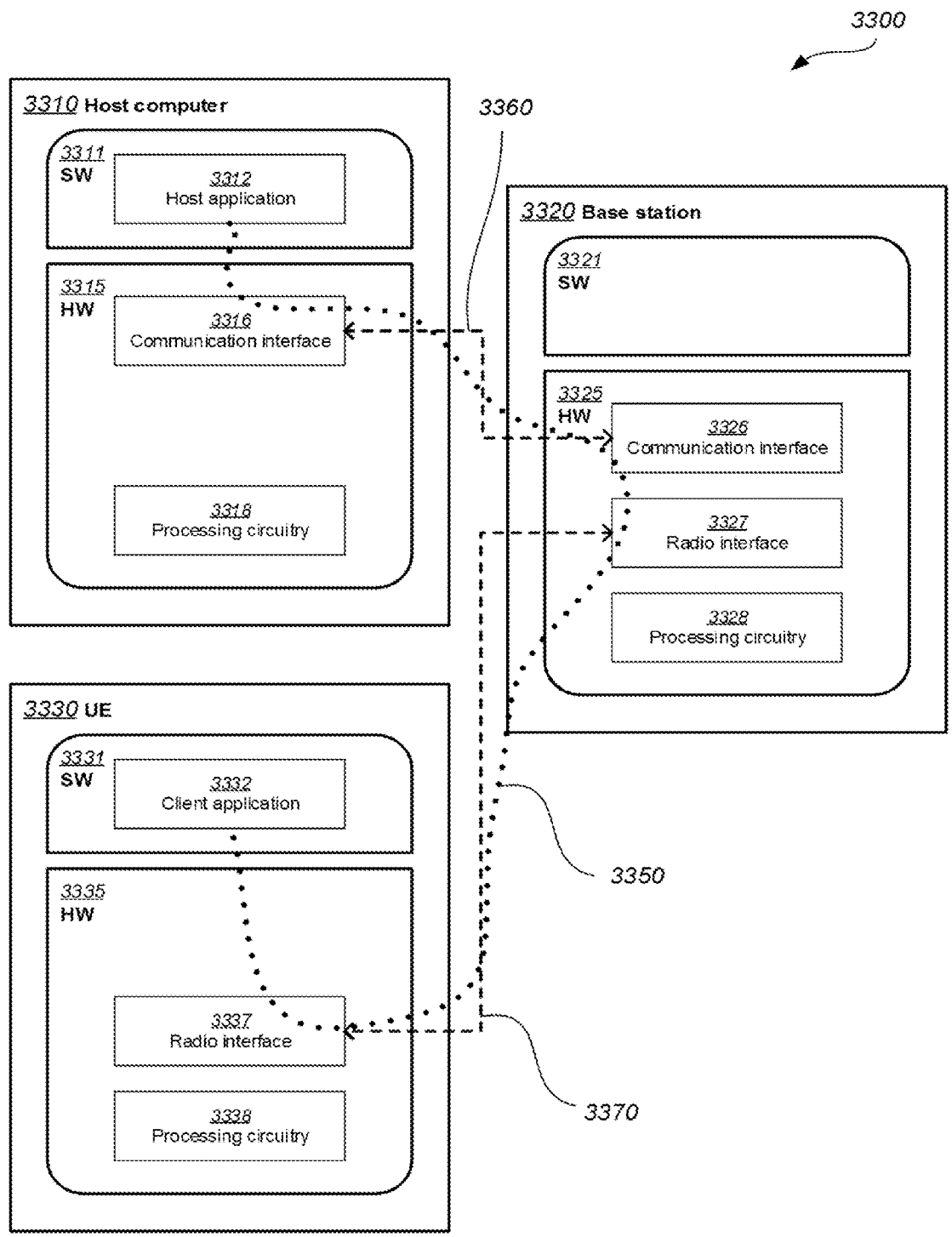
FIG. 6 is a generalized block diagram of a host computer communicating via a base station with a user equipment over a partially wireless connection.
Figures 7, 8:
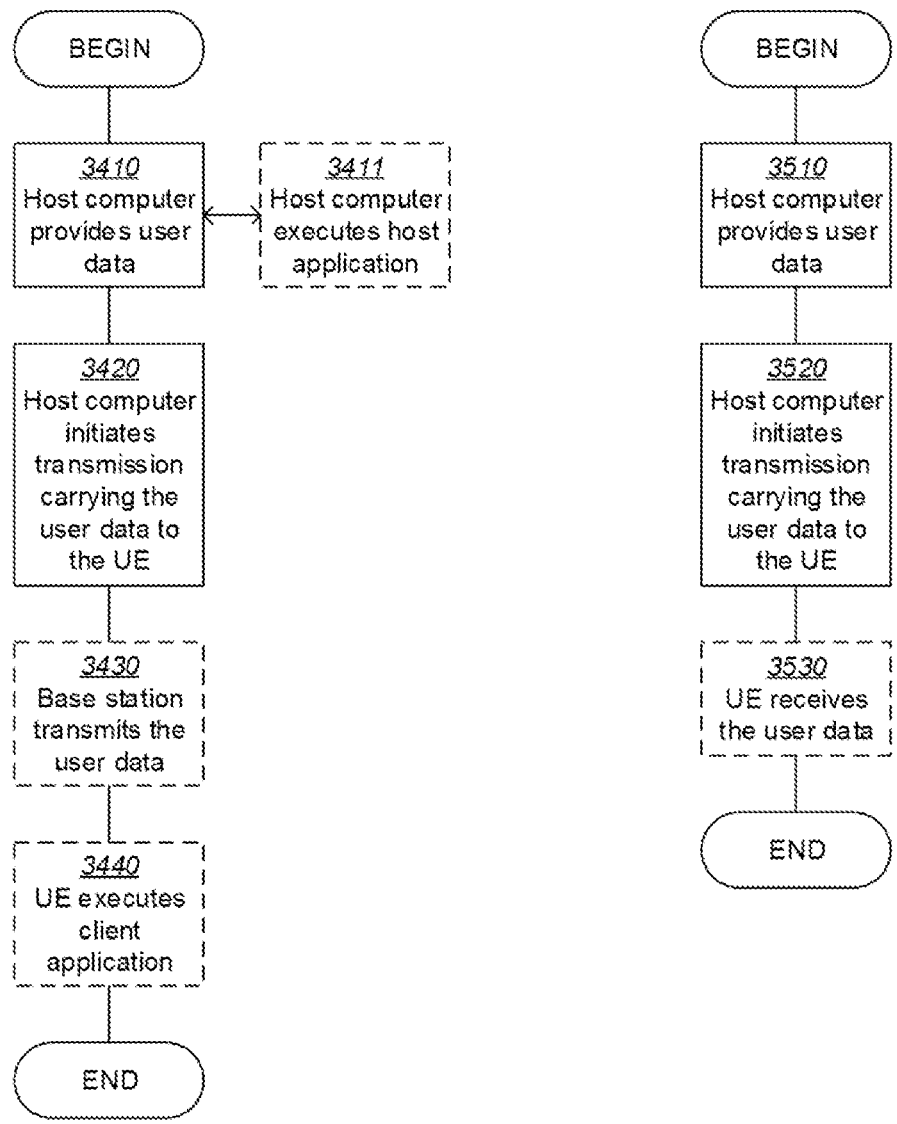
FIGS. 7 to 10 are flowcharts illustrating methods implemented in a communication system including a host computer, a base station and a user equipment.

It is noted that the host computer 3310, base station 3320 and UE 3330 illustrated in FIG. 6 may be identical to the host computer 3230, one of the base stations 3212a, 3212b, 3212c and one of the UEs 3291, 3292 of FIG. 7, respectively. This is to say, the inner workings of these entities may be as shown in FIG. 6 and independently, the surrounding network topology may be that of FIG. 5.

In FIG. 6, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 7 is a flowchart illustrating a method implemented in a communication system, in accordance with one embodiment. The communication system includes a host computer, a base station such as the network node 110, and a UE such as the wireless device 120, which may be those described with reference to FIG. 5 and FIG. 6. For simplicity of the present disclosure, only drawing references to FIG. 7 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 8 is a flowchart illustrating a method implemented in a communication system, in accordance with one embodiment. The communication system includes a host computer, a base station such as a AP STA, and a UE such as a Non-AP STA which may be those described with reference to FIG. 5 and FIG. 6. For simplicity of the present disclosure, only drawing references to FIG. 8 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figure 9:
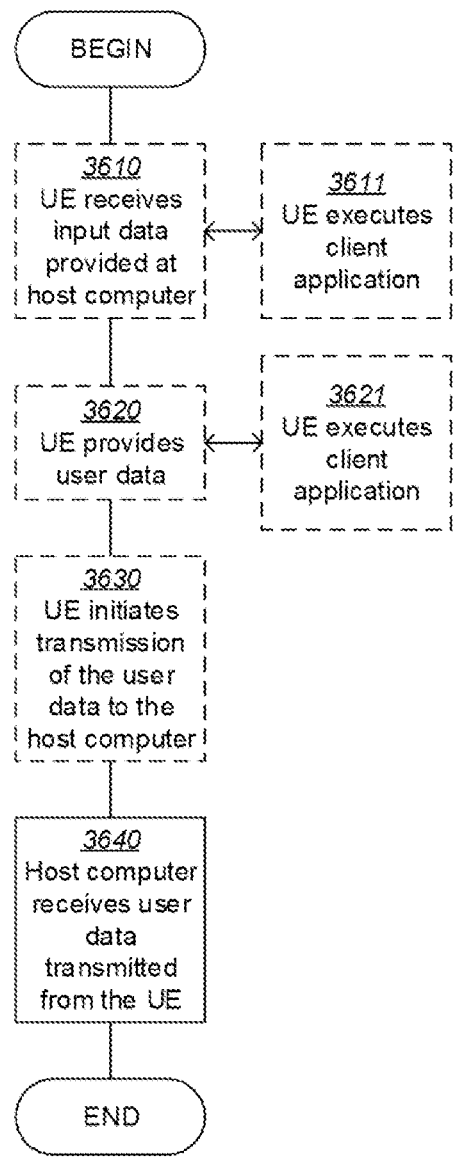

FIG. 9 is a flowchart illustrating a method implemented in a communication system, in accordance with one embodiment. The communication system includes a host computer, a base station such as a AP STA, and a UE such as a Non-AP STA which may be those described with reference to FIG. 5 and FIG. 6. For simplicity of the present disclosure, only drawing references to FIG. 9 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

Figure 10:
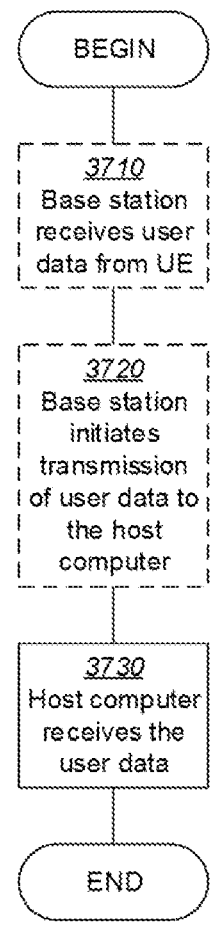

FIG. 10 is a flowchart illustrating a method implemented in a communication system, in accordance with one embodiment. The communication system includes a host computer, a base station such as a AP STA, and a UE such as a Non-AP STA which may be those described with reference to FIG. 5 and FIG. 6. For simplicity of the present disclosure, only drawing references to FIG. 10 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node for beam management in a wireless communications network, the method comprising:
  receiving from a User Equipment, UE, one or more first quality values measured by the UE on first reference signals transmitted by the network node in respective one or more beams comprised in a first set of candidate beams;
  selecting for an upcoming data communication with the UE, a serving beam out of the first set of candidate beams based on the received quality values;
  creating a rule related to signal quality;
  obtaining one or more second quality values related to respective subsequent messages transmitted to the UE in the selected serving beam; and
  as long as the rule is fulfilled with respect to tho second quality value, transmitting one or more further subsequent messages only in the serving beam, the rule defining a quality value based on at least one of the first quality values, and the rule fulfilled as long as the difference between the second quality value and the at least one of the first quality values is below a first threshold value and above a second threshold value.

2. The method according to claim 1, wherein the messages are reference signals and wherein the second quality values are measured by the UE on subsequent reference signals transmitted in the selected serving beam.

3. The method according to claim 1, wherein the rule is decided to be fulfilled based on a comparison of the second quality value with a quality value defined by the rule.

4. The method according to claim 1, further comprising:
  determining to generate a second set of beam candidates based on whether the rule is fulfilled.

5. The method according to claim 1, wherein the rule defines a reference quality value, and wherein the rule is fulfilled as long as the difference between the second quality value and the reference quality value is below a third threshold value and above a fourth threshold value.

6. The method according to claim 1, wherein the rule defines an absolute quality value, and wherein the rule is fulfilled as long as the second quality value is above the absolute quality value.

7. The method according to claim 6, wherein the message is any one out of a Physical Downlink Control Channel, PDCCH message, and a Physical Downlink Shared Channel, PDSCH, message; and
  the respective second quality value is based on whether the UE is considered to have received the message from the network node.

8. The method according to claim 7, wherein the respective second quality value is initially set to the same value as the absolute quality value, and is:
  increased a predetermined step when the UE is considered to have received the message; and
  decreased a predetermined step when the UE is considered to not have received the message.

9. The method according to claim 7, wherein the respective second quality value is initially set to the same value as the absolute quality value, and wherein the absolute quality value is:
  decreased a predetermined step when the UE is considered to have received the message; and increased a predetermined step when the UE is considered to not have received the message.

10. A network node for beam management in a wireless communications network, the network node being comprising:
processing circuitry configured to:
receive from a User Equipment, UE, one or more first quality values measured by the UE on first reference signals transmitted by the network node in respective one or more beams comprised in a first set of candidate beams;
select for an upcoming data communication with the UE, a serving beam out of the first set of candidate beams based on the received quality values; create a rule related to signal quality;
obtain one or more second quality values related to respective subsequent messages transmitted to the UE in the selected serving beam; and
as long as the rule is fulfilled with respect to second quality value, transmit one or more further subsequent messages only in the serving beam, the rule defining a quality value based on at least one of the first quality values, and the rule fulfilled as long as the difference between the second quality value and the at least one of the first quality values is below a first threshold value and above a second threshold value.

11. The network node according to claim 10, wherein the messages are reference signals and wherein the second quality values are configured to be measured by the UE on subsequent reference signals transmitted in the selected serving beam.

12. The network node according to claim 10, wherein the rule is to be decided to be fulfilled based on a comparison of the second quality value with a quality value defined by the rule.

13. The network node according to claim 10, further being configured to:
determine whether to generate a second set of beam candidates based on whether the rule is fulfilled.

14. The network node according to claim 10, wherein the rule defines a reference quality value, and wherein the rule is fulfilled as long as the difference between the second quality value and the reference quality value is below a third threshold value and above a fourth threshold value.

15. The network node according to claim 10, wherein the rule defines an absolute quality value, and wherein the rule is fulfilled as long as the second quality value is above the absolute quality value.

16. The network node according to claim 15, wherein
the message is any one out of a Physical Downlink Control Channel, PDCCH message, and a Physical Downlink Shared Channel, PDSCH, message; and
the respective second quality value is based on whether the UE is considered to have received the message from the network node.

17. The network node according to claim 16, wherein the respective second quality value is initially set to the same value as the absolute quality value, and is:
increased a predetermined step when the UE is considered to have received the message; and
decreased a predetermined step when the UE is considered to not have received the message.

18. The network node according to claim 16, wherein the respective second quality value is initially set to the same value as the absolute quality value, and wherein the absolute quality value is:
decreased a predetermined step when the UE is considered to have received the message; and
increased a predetermined step when the UE is considered to not have received the message.

* * * * *